United States Patent [19]

Inagaki

[11] Patent Number: 4,649,765

[45] Date of Patent: Mar. 17, 1987

[54] POWER TRANSMISSION

[75] Inventor: Toshiyuki Inagaki, Kariya, Japan

[73] Assignee: Aisin-Seiki Kabushiki Kaisha, Kariya, Japan

[21] Appl. No.: 796,787

[22] Filed: Nov. 12, 1985

[51] Int. Cl.⁴ .............................................. F16H 3/08
[52] U.S. Cl. ...................................... 74/359; 74/360; 74/333
[58] Field of Search ................ 74/359, 360, 343, 333, 74/356

[56] References Cited

U.S. PATENT DOCUMENTS

| 2,825,232 | 3/1958 | Sieving et al. | 74/359 |
| 3,893,345 | 7/1975 | Sisson et al. | 74/360 |
| 4,038,882 | 8/1977 | Keller | 74/359 |
| 4,145,935 | 3/1979 | Herlitzek | 74/360 |
| 4,392,391 | 7/1983 | Jameson et al. | 74/359 |
| 4,488,446 | 12/1984 | Nishikawa et al. | 74/359 |
| 4,566,348 | 1/1986 | Akashi et al. | 74/359 |
| 4,570,503 | 2/1986 | Theobold | 74/360 |
| 4,594,908 | 6/1986 | Akashi et al. | 74/359 |

FOREIGN PATENT DOCUMENTS

| 1213261 | 3/1966 | Fed. Rep. of Germany | 74/359 |
| 2410164 | 9/1975 | Fed. Rep. of Germany | 74/359 |
| 2904061 | 8/1980 | Fed. Rep. of Germany | 74/359 |
| 0149444 | 9/1983 | Japan | 74/359 |
| 2119461 | 11/1983 | United Kingdom | 74/359 |

Primary Examiner—Leslie A. Braun
Assistant Examiner—Martin G. Belisario
Attorney, Agent, or Firm—Burns, Doane, Swecker & Mathis

[57] ABSTRACT

A power transmission includes: a driving shaft; a driving gear fixedly mounted on the driving shaft; a first gear rotatably mounted on the driving shaft; a first clutch for integrally rotatably connecting the first gear and the driving shaft with each other, the first clutch being disposed at axially one side of the driving gear; a first intermediate shaft disposed in parallel with the driving shaft; a second gear rotatably mounted on the first intermediate shaft and meshed with the driving gear; a second clutch for integrally rotatably connecting the second gear and the first intermediate shaft with each other, the second clutch being disposed at the axially other side of the driving gear; a third gear rotatably mounted on the first intermediate shaft; a third clutch for integrally rotatably connecting the third gear and the first intermediate shaft with each other; a fourth gear meshed with the second gear; a fifth gear meshed with the third gear; a second intermediate shaft on which the fourth and fifth gears are fixedly mounted; a sixth gear fixedly mounted on the first intermediate shaft; an output gear meshed with the first and sixth gears; and an output shaft provided with the output gear.

3 Claims, 2 Drawing Figures

POWER TRANSMISSION

BACKGROUND OF THE INVENTION

1. Field of the Invention

The present invention generally relates to an improvement for power transmission, and particularly relates to an improvement of a transmission for use in an industrial vehicle such as a fork lift or the like having a transmission mechanism of two forward stages and one backward stage, or one forward one stage and two backward stages.

2. Description of the Prior Art

The prior art concerning the present invention is disclosed, for example, in Japanese Patent Unexamined Publication No. 59-110947. As shown in FIG. 2, the prior art transmission is constituted by forward two-stage gear trains, that is, "H" and "L" forward gear trains, and a backward one-stage gear train, that is, an "R" backward gear train. The transmission includes an input shaft 111; an "H" driving gear 112 fixedly mounted on the input shaft 111; an "L" driving gear 113 rotatably mounted on the input shaft 111; and "L" clutch 114 for integrally rotatably connecting the "L" driving gear 113 and the input shaft 111 with each other; an "R" driving gear 115 rotatably mounted on the input shaft 111; an "R" clutch 116 for integrally rotatably connecting the "R" driving gear 115 and the input shaft with each other; an "L" intermediate gear 117 meshed with the "L" driving gear 113; an intermediate shaft 118 on which the "L" intermediate gear 117 is fixedly mounted; an "H" intermediate gear 119 rotatably mounted on the intermediate shaft 118 and meshed with the "H" driving gear 112; and "H" clutch 120 for integrally rotatably connecting the "H" intermediate gear 119 and the intermediate shaft with each other; an intermediate output gear 121 fixedly mounted on the intermediate shaft 118; an output gear 122 meshed with the intermediate output gear 121 and the "R" driving gear 115; and an output shaft 123 provided with the output gear 122. The transmission is arranged to have two, "H" and "L", forward stages and one, "R", backward stage.

In this prior art transmission, certain operational problems have been experienced. That is, it is necessary to separate the shafts 111 and 118 from each other so that the "L" and "H" clutches 114 and 120 do not interfere in each other because the clutch 114 and the clutch 120 are positioned in the direction of the shaft distance in the positional relation to cause an interference therebetween. Therefore, the intershaft distance between the shafts 111 and 118 has been increased, and thereby the whole transmission is increased in size in the direction of the above-mentioned intershaft distance.

SUMMARY OF THE INVENTION

An object of the present invention is to solve the foregoing problems in the prior art.

Another object of the present invention is to provide a transmission which is reduced in size in the direction of intershaft distance.

In order to attain the foregoing objects, the transmission according to the present invention comprises: a driving shaft; a driving gear fixedly mounted on the driving shaft; a first gear rotatably mounted on the driving shaft; a first clutch for integrally rotatably connecting the first gear and the driving shaft with each other, the first clutch being disposed axially on one side of the driving gear; a first intermediate shaft disposed in parallel with the driving shaft; a second gear rotatably mounted on the first intermediate shaft and meshed with the driving gear; a second clutch for integrally rotatably connecting the second gear and the first intermediate shaft with each other, the second clutch being disposed axially on the other side of the driving gear; a third gear rotatably mounted on the first intermediate shaft; a third clutch for integrally rotatably connecting the third gear and the first intermediate shaft with each other; a fourth gear meshed with the second gear; a fifth gear meshed with the third gear; a second intermediate shaft on which the fourth and fifth gears are fixedly mounted; a sixth gear fixedly mounted on the first intermediate shaft; an output gear meshed with the first and sixth gears; and an output shaft provided with the output gear.

The thus arranged transmission functions as follows:

Upon connection of the first clutch, a first power train system is constituted along the path from the input shaft to the output shaft through the first clutch, the first gear, and the output gear; upon connection of the second clutch, a second power train system is constituted along the path from the input shaft to the output shaft through the driving gear, the second gear, the second clutch, the first intermediate shaft, the sixth gear, and the output gear; and upon connection of the third clutch, a third power train system is constituted along the path from the input shaft to the output shaft through the driving gear, the second gear, the fourth gear, the second intermediate shaft, the fifth gear, the third gear, the third clutch, the first intermediate shaft, the sixth gear, and the output gear. The first clutch is disposed in opposition to the second and third clutches with respect to the second gear in the axial direction. Therefore, the first clutch never interferes in the second and third clutches in the direction of the intershaft distance, regardless of the radius of the driving gear and-/or the second gear. Accordingly, it is possible to select the driving gear to have a radius smaller than that of the first clutch, or alternatively it is possible to select the second gear to have a radius smaller than those of the second and third clutches, so that the intershaft distance can be shortened.

The present invention will be apparent from the following detailed description taken in conjunction with the accompanying drawings.

DETAILED DESCRIPTION OF THE PREFERRED EMBODIMENT

An embodiment of the transmission according to the present invention will be described hereunder.

Figure 1:
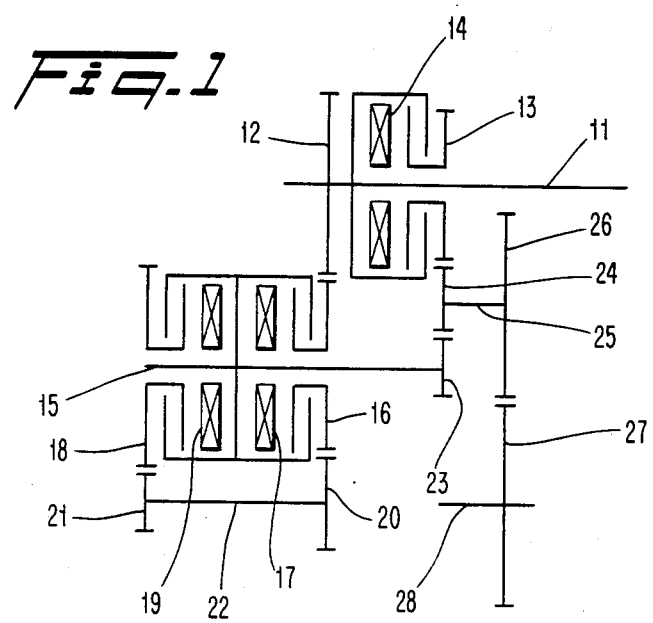
FIG. 1 is a diagram showing the gear trains constituting the transmission of the two forward stages and one backward stage, according to the present invention.
Figure 2:
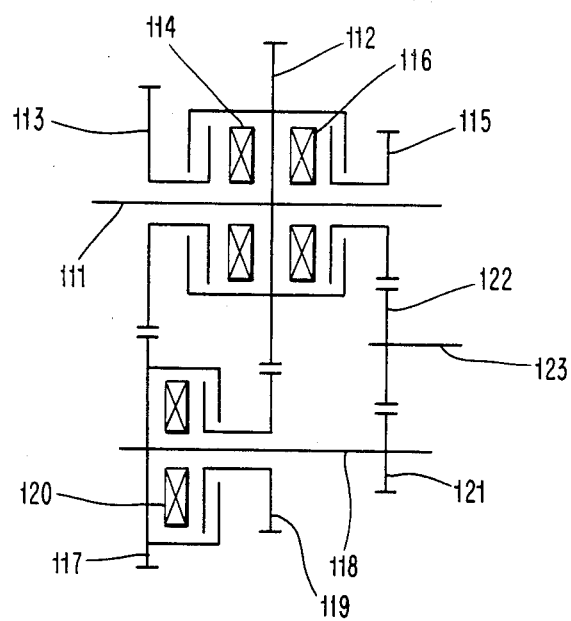
FIG. 2 shows the prior art gear trains.

In FIG. 1, a forward driving gear 12 is fixedly mounted on an input shaft 11, and a first gear, that is, a backward reverse gear 13 is rotatably fittingly mounted on the input shaft 11. The reverse gear 13 and the input shaft 11 are made to be integrally rotatable by a first clutch, that is, an "R" clutch 14. A second gear, that is, a forward second-stage gear or forward "H" gear 16 and a third gear, that is, a forward first-stage gear or forward "L" gear 18, are rotatably fittingly mounted on a first intermediate shaft, that is a forward shaft 15, disposed in parallel with the input shaft 11. The forward "H" gear 16 being always meshed with the driving gear 12. A second clutch, that is, an "H" clutch 17 for rotating the forward "H" gear 16 integrally with the forward shaft 15 and a third clutch, that is, an "L" clutch 19 for rotating the forward "L" gear 18 integrally with the forward shaft 15 are disposed on the forward shaft 15. These "H" and "L" clutches 17 and 19 are disposed in opposition to the "R" clutch 14 in the axial direction of shafts with respect to a position where the driving gear 12 and the forward "H" gear 16 are meshed with each other. A second intermediate shaft, that is, an idle shaft 22, is disposed in parallel with the forward shaft 15. A fourth gear, that is, an idle "H" gear 20 is always meshed with the forward "H" gear 16 and a fifth gear, that is, an idle "L" gear 21 is always meshed with the forward "L" gear 18, are fixedly mounted on the forward shaft 15. A sixth gear, that is, a forward final gear 23 is fixedly mounted on forward shaft 15. A first output gear 24 is always meshed with the forward final gear 23 as well as the reverse gear 13 and is fixedly mounted on a first output shaft 25. Further, a second output gear 26, a second output shaft 28, and a third output gear 27 are incorporated in the transmission in order to provide matching with the vehicle.

In the arrangement as described above, upon actuation of the "L" clutch 19 during the operation of the forward first stage, the power is transmitted from the input shaft 11 to the first output gear 24 through the driving gear 12, the forward "H" gear 16, the idle "H" gear 20, the idle shaft 22, the idle "L" gear 21, the forward "L" gear 18, the "L" clutch 19, the forward shaft 15, and the forward final gear 23 in the order as described above, so as to reach the output shaft system including the output shafts 25 and 28 and the output gears 26 and 28. Upon actuation of the "H" clutch 17 during the operation of the forward second stage, the power is transmitted from the input shaft 11 to the first output gear 24 through the driving gear 12, the forward "H" gear 16, the "H" clutch 17, the forward shaft 15, and the forward final gear 23 in the order as described above, so as to reach the same output shaft system as described above including the output shafts 25 and 28 and the output gears 26 and 28. Upon actuation of the "R" clutch 14 during the backward operation, the power is transmitted from the input shaft 11 to the first output gear 24 through the "R" clutch 14 and the reverse gear 13 so as to reach the same output shaft system as described above including the output shafts 25 and 28 and the output gears 26 and 28. In those operations described above, even in the case where the diameters of the driving gear 12 and the forward "H" gears 16 are smaller than those of the "R" and "H" clutches 14 and 17 respectively to shorten the distance between the shafts 11 and 15, the "R" and "H" clutches 14 and 17 never interfere in each other.

Although the output shaft system is constituted by the first output shaft 25, the second output gear 26, the third output gear 27, and the second output shaft 28 in FIG. 1, it may be, alternatively, constituted only by the first output shaft 15.

Further, the positions of the "H" and "L" clutches 19 and 17, the forward "H" and "L" gears 16 and 18, and the idle "H" and "L" gears 20 and 21 may be, alternatively, reversed respectively.

Moreover, in order to obtain a transmission of one forward stage and two backward stages, it will do, in FIG. 1, to arrange the reverse systems 13 and 14 to be the one forward stage and the forward "H" and "L" systems 12 and 15 to 23 to be the two backward stages.

In the prior art transmission, generally, depending on the arrangement thereof, oil is accumulated around the input shaft and therefore the two clutches, that is, the "L" and "R" clutches 114 and 116, are steeped in the oil, so that the resistance due to the oil is large resulting in a power loss.

Unlike the prior art, in the transmission according to present invention, only one first clutch is disposed around the input shaft, so that there is such a particular effect that the resistance due to the oil is small to make the power loss reduced.

What is claimed is:
1. A power transmission comprising:
   a driving shaft;
   a driving gear fixedly mounted on said driving shaft;
   a first gear rotatably mounted on said driving shaft;
   a first clutch for integrally rotatably connecting said first gear and said driving shaft with each other, said first clutch being disposed axially one side of said driving gear;
   a first intermediate shaft disposed in parallel with said driving shaft;
   a second gear rotatably mounted on said first intermediate shaft and meshed with said driving gear;
   a second clutch for integrally rotatably connecting said second gear and said first intermediate shaft with each other, said second clutch being disposed at the axial other side of said driving gear;
   a third gear rotatably mounted on said first intermediate shaft;
   a third clutch for integrally rotatably connecting said third gear and said first intermediate shaft with each other;
   a fourth gear meshed with said second gear;
   a fifth gear meshed with said third gear;
   a second intermediate shaft on which said fourth and fifth gears are fixedly mounted;
   a sixth gear fixedly mounted on said first intermediate shaft;
   an output gear meshed with said first and sixth gears; and
   an output shaft provided with said output gear.

2. A power transmission according to Claim 1: said power transmission including a forward two-stage gear tran and a backward one-stage gear train; said backward one-stage gear train comprising said first clutch and said output gear; one of said forward two-stage gear trains being constituted by said driving gear, said second gear, said second clutch, said first intermediate shaft, said sixth gear, and said output gear; the other one of said forward two-stage gear trains being constituted by said driving gear, said second gear, said fourth gear, said second intermediate shaft, said fifth gear, said third gear, said third clutch, said first intermediate shaft, said sixth gear, and said output gear.

3. A power transmission according to Claim 2, in which the reduction gear ratio of said one of said forward two-stage gear trains is selected to be smaller than that of the other one of said forward two-stage gear trains.

* * * * *